Sept. 12, 1967 — M. H. EVANS — 3,341,342
METHOD OF GRINDING AND COOLING CEMENT
Filed June 14, 1963 — 2 Sheets-Sheet 1

INVENTOR.
MILTON HARRISON EVANS
ATTORNEY

Sept. 12, 1967     M. H. EVANS     3,341,342
METHOD OF GRINDING AND COOLING CEMENT
Filed June 14, 1963     2 Sheets-Sheet 2

INVENTOR.
MILTON HARRISON EVANS
BY
ATTORNEY 3,341,342
METHOD OF GRINDING AND COOLING CEMENT
Milton Harrison Evans, Los Angeles, Calif., assignor to Southwestern Portland Cement Company, Los Angeles, Calif., a corporation of West Virginia
Filed June 14, 1963, Ser. No. 288,859
7 Claims. (Cl. 106—102)

This application is a continuation-in-part of my copending application Ser. No. 108,791, filed May 9, 1961, and now abandoned.

This invention relates to the manufacture of cement, and more particularly to an improved apparatus and method for the continuous processing of cement clinker to produce cement of the highest quality and uniformity and characterized in that the product is cooled to a temperature not in excess of 160 degrees F. and preferably 150 degrees F. or less at the end of the processing operation.

A major and most vexatious problem attending the processing of Portland cement involves simultaneously pulverizing the cement clinker and gypsum while endeavoring to cool the components sufficiently to minimize dehydration of the gypsum during the pulverizing operation as well as while the finished cement is being stored. Heretofore finished cement going into storage often has an undesirably high temperature commonly ranging between 200 and 225 degrees F. The cement retains its latent heat substantially without loss through long storage periods and this is generally true whether the cement is stored in bulk or in shipping containers of a size suitable for handling. The problem is a particularly serious one in connection with bulk storage since the large capacity storage silos employed for this purpose are notoriously poor heat dissipators. Not only is the cement itself an exceedingly poor heat conductor but so are the thick concrete silo walls. Customarily the cement is retained in bulk inventory until shortly before required for use. The short period intervening between removal from storage and use is far too brief to permit adequate cooling of the cement to a value found essential to the production of concrete having the strength and other characteristics known to be available if the cement is properly cooled before being made into concrete mix.

Another factor of importance in the final processing of cement is maintaining the temperature of the material undergoing pulverizing sufficiently cool to prevent any substantial dehydration of the essential gypsum component. Pulverizing and milling cement clinker is accompanied by temperature rises to objectional levels productive of serious dehydration of the gypsum. Proposals to safeguard against this undesirable condition have included many expedients such as circulating cooling air through a jacketed grinding mill to control the temperature but this requires a costly mill and is attended by numerous problems.

Another common expedient is to recirculate the partially pulverized clinker between the mill and a separator at a rate and under conditions to cool both the clinker and the pulverized cement constituent. Such recirculation and cooling is advantageous from the standpoint of providing for the continuous removal of ground portions of the product as well as promoting the efficiency of the pulverizing operation by cooling the clinker while circulating outside the mill proper. Although this practice is beneficial to a degree, it is dependent on close supervision by skilled operators; even then the obtainable cooling is far below that desired. It has also been proposed to cool the pulverizing mill by spraying the exterior with water as well as cooling the clinker itself with a water spray as it enters the pulverizing mill from the bulk clinker storage.

Other proposals involve providing special massive and high capacity heat exchangers or coolers for the finished product making use of water jackets to carry away the heat. Not only are these expensive to build, maintain and operate, but serious problems are involved in safeguarding against water leakage into contact with the cement and the condensation of water vapor within portions of the cooler charged with cement. Moreover and of particular concern, such cement coolers do little to counteract dehydration of the gypsum.

By the present invention there is provided an inexpensive controlled and adjustable high efficiency cooling system for the continuous processing and handling of cement ingredients into a finished product delivered to the bulk storage facility at a temperature not in excess of 160 degrees F. and desirably ranging between 125 to 150 degrees F. This low terminal temperature of the cement product enables the cement manufacturer to meet exacting temperature requirements and other specifications commonly imposed by cement users.

According to the present invention these objectives are obtained in major part by pulverizing the gypsum independently of the clinker and then partially or fully precooling the pulverized clinker in intimate contact with ambient air before introducing cool pulverized gypsum in such manner as to uniformly intermix the pulverized clinker and gypsum. Desirably, cement cooling followed by intermixing the pulverized clinker and gypsum is carried out in a levitating stream of cooling air being additionally employed to convey the low-temperature mixture into a baghouse or other suitable separator. Desirably, the levitating air stream is maintained under subatmospheric conditions in all parts of the apparatus and includes a number of separate individually controlled branches merging in a vertical riser or main cooler. These branches serve cooling purposes and provide means for bleeding clinker dust-laden air from the equipment into the main stream enroute to the baghouse.

The intimate turbulent contact of ambient atmospheric air at, say 100 degrees F. or less, with particles of pulverized clinker at, say 200 degrees to 250 degrees F. results in extremely rapid cooling of the clinker to a temperature equilibrium. Contributing to this result is the fact that the specific heat of air is higher than that of clinker. Final equilibrium temperature depends on the relative quantities of pulverized clinker and air, the latter being admitted in any amount above the minimum necessary to levitate the pulverized solids and to cool the cement to the temperature desired for the finished product.

The substantially cooled mixture of air, pulverized clinker and conditioning agents therefor is subdivided into smaller streams for discharge into an air and cement separator as, for example, a commercial type of baghouse. Desirably, the mixture is delivered downwardly into the baghouse in order that the momentum of cement, aided by gravity, will facilitate passage of the cement directly into the underlying collecting hoppers as the air passes laterally through the side walls of the filter bags into a passage leading to the suction creating fans. The efficacy and capability of such a system to handle continuously large volumes of the finished product is indicated by the fact that recent tests have established that a single riser duct handling a suction air flow of approximately 30,000 cubic feet of air per minute at a velocity of 4,000 f.p.m., readily levitates 1,000 lbs. of cement per minute while cooling the same to substantially less than 150 degrees F. as it discharges from the baghouse.

Accordingly, it is a primary object of the present invention to provide an improved method and apparatus for continuously processing freshly pulverized clinker while dissipating the heat of grinding to the atmosphere in a levitating gas stream enroute to bulk storage or packaging facilities.

Another object of the invention is the provision of a method and apparatus for continuously pulverized precooled cement clinker free of added gypsum and adding pulverized gypsum in the proper proportion to the pulverized clinker after the latter has been cooled sufficiently to avoid dehydration of the gypsum.

Another object of the invention is the provision of a method and apparatus for pulverizing precooled cement clinker while recirculating the same through a closed circuit between a ball mill and a separator including provision for levitating pulverized clinker in atmospheric cooling air under subatmospheric pressure.

Another object of the invention is the provision of an improved technique for pulverizing clinker and adding conditioning agents while simultaneously cooling the clinker, addition of the conditioning agents occurring at a temperature or temperatures not adversely affecting the conditioning agents.

Another object of the invention is the provision of an improved method of processing cement clinker to provide a finished product cooled to a temperature not in excess of 160 degrees F. utilizing ambient atmospheric air for cooling and including the separate and simultaneous pulverizing of gypsum in a predetermined relative proportion to the pulverized cement clinker followed by dispersal of the pulverized gypsum into levitated pulverized clinker after the latter has been cooled below the dehydration temperature of the gypsum.

Another object of the invention is the provision of an improved method of adding and admixing conditioning agents to pulverized clinker while the latter is suspended in a levitating stream of air and then separating the resulting cement product from the air stream.

These and other more specific objects will appear upon reading the following specification and claims and upon considering in connection therewith the attached drawing to which they relate.

Referring now to the drawing in which a preferred embodiment of the invention is illustrated.

Figure 1:
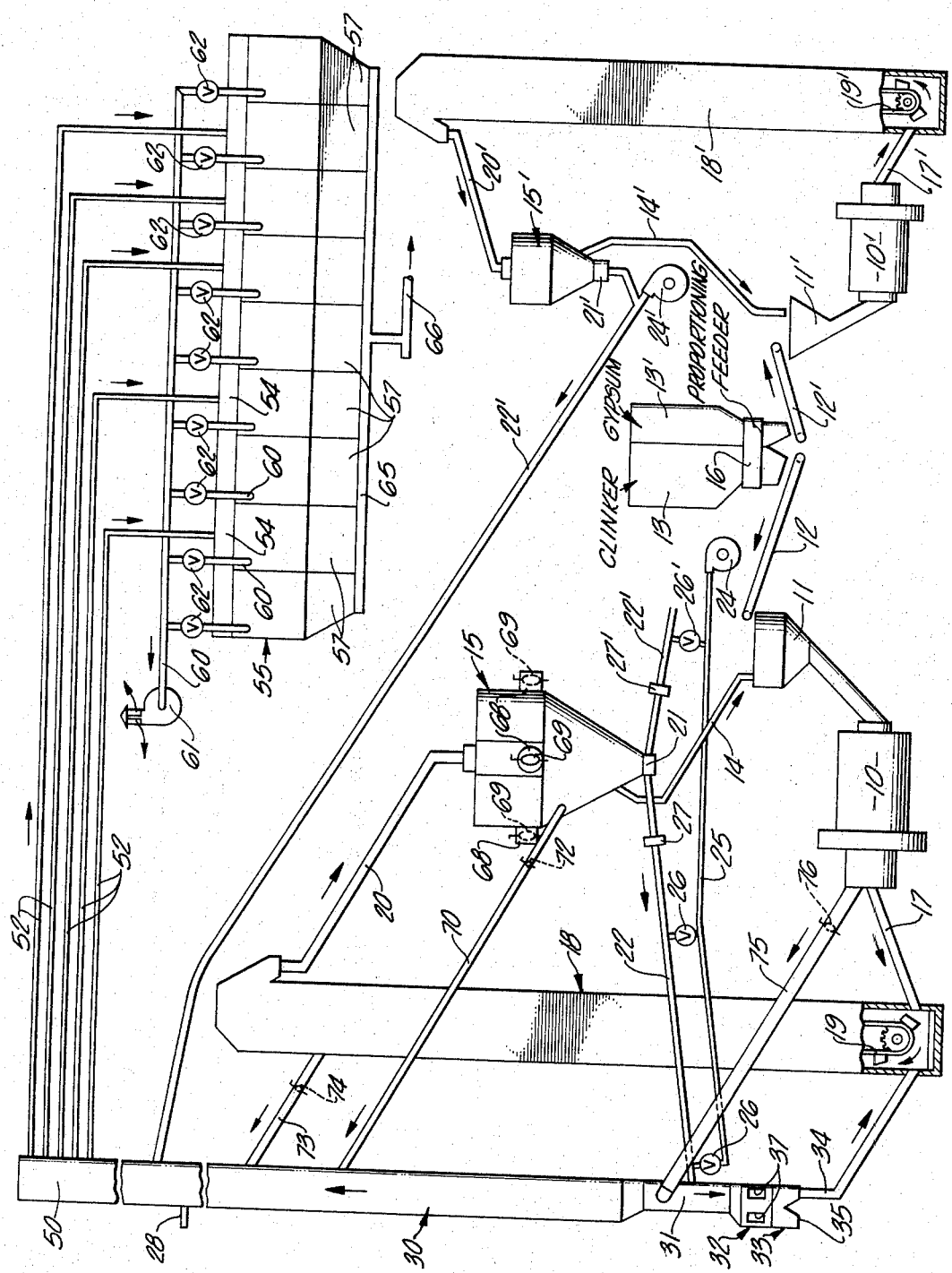
FIGURE 1 is a general schematic view of one preferred embodiment of apparatus for practicing the present invention.

Referring more particularly to FIGURE 1, there is shown a preferred arrangement of the invention apparatus having any suitable type of clinker grinding and pulverizing mill 10, as a ball mill, provided with a receiving hopper 11. Precooled clinker having an ambient or somewhat higher temperature from hopper 13 discharges onto conveyor 12 merges with partially ground clinker entering hopper 11 through return conveyor duct 14 from any conventional type separator or classifier 15. Rotation of mill 10 pulverizes a major portion of the clinker and discharging the resultant mixture of pulverized clinker and partially ground clinker into the downwardly inclined duct 17 leading into the lower end of elevator casing 18. The latter houses a belt, travelling bucket, or other suitable type conveyor 19 driven by a motor (not shown) and elevates the referred to mixture into the upper end of classifier 15 by way of duct 20.

The described components of the apparatus comprise a closed circuit through which the semi-ground and pulverized clinger is recirculated until finely pulverized. Heretofore, the pulverizing and recirculation of this clinker has been complicated by the need for so regulating grinding and the flow of cooling medium through the closed circuit as to minimize in some degree dehydration of gypsum added to the entering clinker and important as a conditioner or cement setting retardant agent. In spite of strenuous efforts, it has been most difficult to hold grinding temperatures below those at which serious dehydration occurs. At low temperatures the rate of dehydration is extremely slow and from a practical standpoint gypsum can be considered to be a relatively stable mineral at temperatures below 110° F. At higher temperatures dehydration occurs at a rapidly increasing rate as is evidenced by the following table:

VAPOR PRESSURE IN THE SYSTEM $CaSO_4 \cdot 2H_2O$-$CaSO_4 \cdot \tfrac{1}{2}H_2O$-WATER VAPOR

| Temperature, Degrees F. | Vapor Pressure, ps*, mm. | Vapor Pressure Water, pw mm. | Relative Humidity, ps/pw*×100 |
|---|---|---|---|
| 32 | 1.17 | 4.57 | 25 |
| 50 | 2.78 | 9.14 | 30 |
| 68 | 6.24 | 17.4 | 36 |
| 104 | 26.3 | 54.9 | 48 |
| 110 | 91.4 | 149 | 61 |
| 176 | 272.4 | 355 | 76 |
| 212 | 710.8 | 760 | 93 |
| 230 | 1,104 | 1,075 | |

* ps is vapor pressure of system at temperature in Column 1, and pw is vapor pressure of water at Column 1 temperature.

From the foregoing table it is seen that dehydration is a function of temperature, time and relative humidity and that it is desirable to prevent the gypsum temperature from rising above 160° F. The gypsum dehydration problem is eliminated by the present invention by the provision of means for separately pulverizing the gypsum thereby permitting clinker grinding and pulverizing to proceed at a maximum high efficiency rate without regard to temperature or relative humidity.

It will be understood that classifier 15 operates in known manner to segregate the finished product from the coarser portions of clinker, the finished fully pulverized clinker settling to the bottom portion 21 of the classifier from which it passes downwardly onto the inclined conveyor duct 22. The flow of pulverized clinker along duct 22 is greatly facilitated by the introduction of pressurized air supplied beneath the flowing stream of pulverized clinker. This air is supplied from a blower 24 and a distributing pipe 25 opening into duct 22 through adjustable valves 26.

In order to provide the desired flexibility of operation, it will be observed that collector 21 also opens into an alternate levitating conveyor 22′ similar to conveyor 22 but leading to an alternate place of pulverized clinker collection. Levitating air is supplied to duct 22′ through a regulating valve 26′ understood as closed while conveyor 22 is in operation. Conveyors 22 and 22′ are also provided with suitable shutoff valves 27, 27′. Normally valve 27′ is closed and valve 27 is open allowing the finished pulverized clinker to be conveyed into the cooling facility to be described presently.

Although pulverized gypsum required as a pulverized clinker conditioning agent may be purchased from commercial sources or prepared in an operation entirely independently of the above-described cement pulverizing operation, definite advantages and economies are to be realized by pulverizing the gypsum simultaneously with the clinker and in an appropriately synchronized manner. Facilities for the latter purpose are shown in the lower right hand corner of FIGURE 1 and include a supply bin 13 for cooled clinker and a second but smaller supply bin 13′ for unground gypsum both connected to a proportioning feeder 16 of any suitable known construction. Feeder 16 operates to supply cement clinker to conveyor 12 and unground gypsum to conveyor 12′ in the predetermined relative proportions desired in the finished cement product. Commonly 4% to 5% gypsum is mixed with 96% to 95% cement clinker, but it will be understood that these proportions can be modified.

All components of the closed circuit for the gypsum pulverizer and its classifier may correspond with the similar components of the clinker pulverizer and classifier circuit. For this reason the same reference characters have been employed for the gypsum circuit as for the corresponding parts of the cement circuit but are distinguished by the addition of a prime. In view of the relatively small quantity of gypsum being pulverized, no difficulty is encountered in holding its grinding temperature sufficiently low to avoid any risk of dehydrating the gypsum to any significant degree.

It will be understood that, if desired, the gypsum pulverizing operation can be conducted in a specially constructed mill of known type incorporating therein provision for separating out the pulverized product thereby avoiding need for elevator 18' and a separate and independent classifier 15'. It is also pointed out that though a fan 24' is illustrated for levitating the stream of gypsum from the classifier into the pulverized cement cooling facility, the volume of gypsum handled is sufficiently small that it is readily conveyed into the cooling riser in a sub-atmospheric stream of levitating air. This alternate made has the advantage of maintaining the pressure within the gypsum pulverizer facilities at a sub-atmospheric value and avoids the likelihood of loss of gypsum or contamination of the surrounding area.

Now to be described as a particularly important feature of the invention is the cooling, mixing and handling facilities for the constituents of the cement product. One of the principal components of these facilities comprises a tubular riser 30 preferably made of good heat conducting material and suitably supported by an exterior framework (not shown) the details of which are not essential to the present invention. As here shown, duct 30 is supported vertically although it will be understood that it may be inclined to the horizontal or formed in sections arranged at different angles to one another in order to conform with available space factors of a particular operating environment. The lower or inlet end of riser 30 includes a venturi-like throat section 31 merging at its lower end with an enlarged entrance chamber 32 provided with one or more collection hoppers 33. The throat section is not essential but is advantageous under certain operating conditions. For example, should any portion of the cement fail to be levitated by the rising air stream or should coarse and not fully pulverized particles of clinker be carried into the riser, these will gravitate into hopper 33. Material falling into the hopper gravitates through return duct 34 back into the lower end of elevator 18 for return to classifier 15. Alternatively, pulverized cement collecting in hopper 33 may be withdrawn from the normally closed alternate discharge spout 35.

Figures 2, 3:
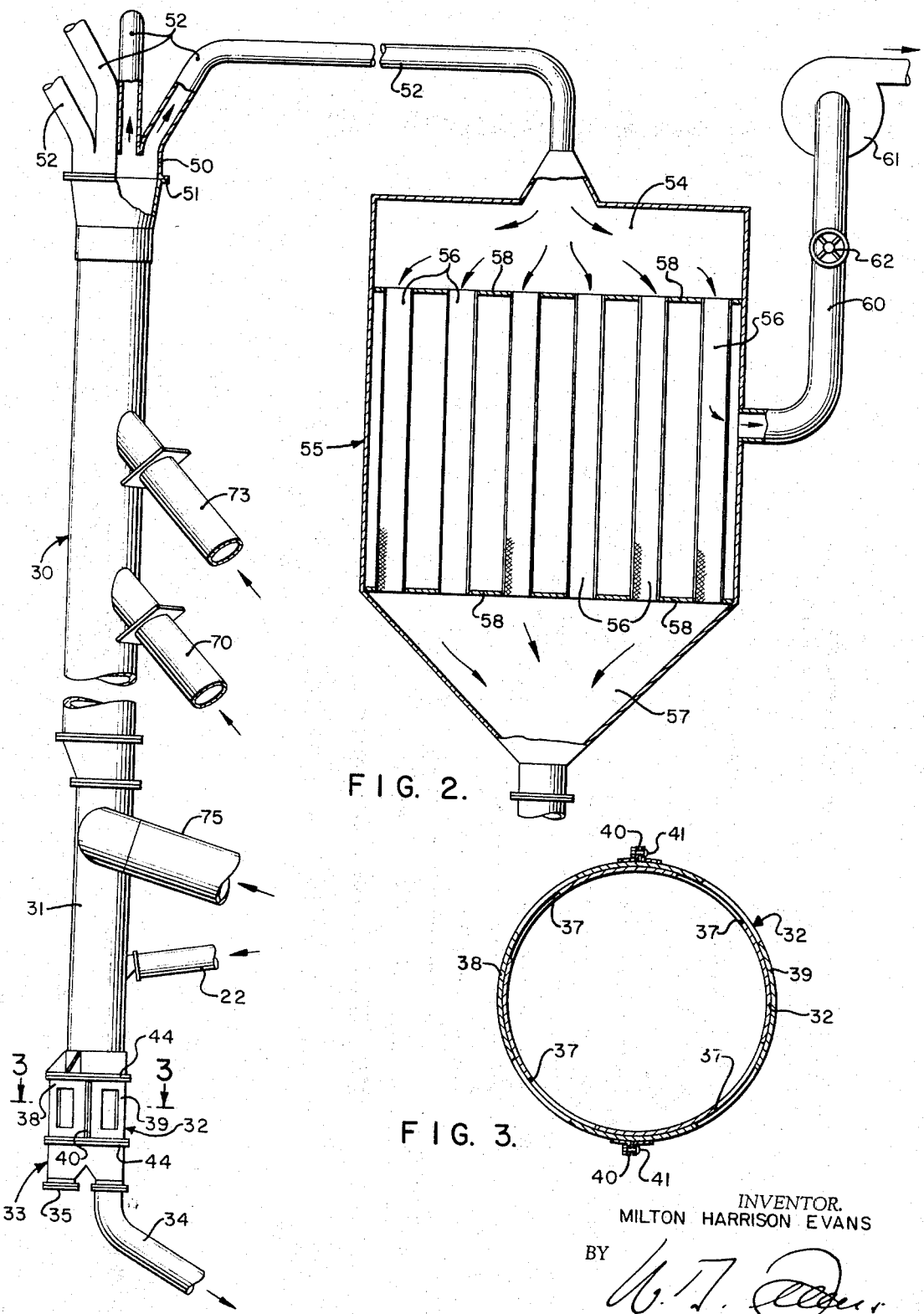
FIGURE 2 is an enlarged detailed view with portions broken away showing details of the cement levitating and cooling system, including means for adding conditioning agents and further details of the air and cement separator.
FIGURE 3 is an enlarged sectional view taken along lines 3—3 on FIGURE 2 showing details of the regulator valve at the entrance to the cooling riser.

Air regulating section 32 has a series of inlet ports 37 (FIGURES 2, 3) having simple means for regulating their effective inlet areas. A simple regulator for this purpose, as shown in FIGURES 2 and 3, comprises a pair of semi-circular sheet metal members 38 and 39 having flanged ends 40 normally clamped together by fasteners 41. Members 38 and 39 are provided with ports corresponding in number and size to inlet ports 37. The upper and lower edges of the sleeve-like regulator valve just described have a close rotary fit with the exterior of tubular section 32, the valve proper being held against axial movement by annular flanges 44, 44 carried by section 32. From the foregoing it will be recognized that the volume of air permitted to enter the bottom of riser 30 is easily controlled by grasping flanges 40, 40 and rotating the sleeve members 38, 39 to vary the uncovered areas of ports 37.

The cross-sectional area of the venturi-like throat 31 assures that the suction air stream flowing upwardly through the riser has a velocity adequate to levitate and distribute throughout the area of the riser the stream of pulverized cement entering from duct 22. This velocity and turbulence also assures high efficiency intermixing of the cement with gypsum and other cement conditioning agents added as will be described herebelow. The high velocity air flowing past the outlet end of conveyor 22 instantly entrains the finely powdered cement, the resulting action creating turbulent conditions in the air stream and causing the cement to be distributed throughout the cross-section of riser 30 while being rapidly elevated in the subatmospheric pressure air stream flowing upwardly through the riser under the impetus of a suction fan to be described presently.

As shown, the upper end of riser 30 opens into a divider fitting 50 secured thereto by the gasketed and bolted flanges 51 carried respectively by the riser and the lower end of fitting 50 (FIGURE 2). This fitting opens into a plurality of smaller diameter ducts 52 each discharging into the center of a separate distributing plenum chamber 54 at the top of each section of a multi-chambered cement and air separator or baghouse, designated generally 55. Ducts 52 serve to split the large stream issued from riser 31 while still in vertical turbulent flow into a plurality of smaller streams to minimize stratification of the solid constituents.

As herein shown, baghouse 55 is of the fully enclosed down flow type, each section being provided with a plurality of open-ended fabric filter tubes 56. The upper ends of these tubes open into a cement plenum chamber 54 and the lower ends open into a cement collecting hopper 57. The opposite ends of the filter bags are suitably supported in known manner by dividing partitions 58 which confine the flow of the material undergoing filtering to the interior of the bags. The enclosing chamber surrounding each section of the baghouse opens only into an outlet duct 60 discharging into the inlet of one or more high capacity suction fans or blowers 61. Each of outlet ducts 60 is provided with a regulatable valve 62. Normally these valves are fully open but they maye be partially closed to the extent necessary to equalize air flow between the various sections of the baghouse, or they may be closed entirely, as when it is desired to recondition and clean a particular section of the baghouse.

While not shown in the schematic representation of FIGURE 1, it will be understood that each chamber or section of the baghouse may have a separate plenum chamber 54, a separate cement inlet duct 52 as well as its own discharge duct 60 in communication with the inlet of suction air fan or fans 61. Hoppers 57, 57 open into suitable collection conveyor means 65 for conveying the cool cement through duct 66 directly to a bulk storage silo or to a packaging facility, neither of which is shown but which will be understood as of conventional construction.

Classifier 15 is provided at its separate ends with at least one and preferably a plurality of air inlet ducts 68, each having a manually adjustable damper or valve 69 adapted to be secured in any desired adjusted position. Sub-atmospheric pressure conditions within the classifier are assured by reason of duct 70 which opens into the lower portion of the classifier and has an outlet discharging laterally into the side of riser 30. This arrangement continuously purges the classifier of fine dust. Although it is not necessary, duct 70 may be provided with a regulatable valve 72 in order that the flow of air through the classifier may be controlled from a single valve rather than from individual valves 69.

Still another duct providing for the circulation of sub-atmospheric pressure air through the closed clinker pulverizing circuit leads from the upper end of elevator 18 into the adjacent side wall of riser 30. Duct 73 is likewise provided with a regulatable valve 74 in order that the portion of air entering riser 30 by way of elevator 18 may be controlled in a manner found to prevent the escape of dust into the atmosphere and to produce the most effective results under the particular operating conditions. A third duct useful in purging the clinker pulverizing circuit comprises a duct 75 having its lower end in communication with the discharge end of pulverizing mill 10 and its opposite end opening into riser 30. As here shown, its point of communication with the riser is at the upper end of throat 31 but it will be understood that, if desired, the point of entry may be located in the main section of the riser. A valve 76 similar to the valve described above permits regulation of the volume of air circulating through pulverizer 10 to suit operating needs and to assure purging of dust-laden air.

Reference has already been made to the facilities for pulverizing gypsum and supplying this cement conditioning agent to pulverized cement. Desirably, duct 22' conveying the proper proportion of pulverized gypsum opens into the upper end of riser 30 at a point short of the latter's upper end but wherein the temperature of the cement has been cooled sufficiently to avoid substantial gypsum dehydration. The air conveying the gypsum through duct 22' is uniformly saturated with the gypsum. Upon its entry into riser 30, further and substantially instantaneous uniform co-mingling with levitated pulverized clinker occurs. It will therefore be recognized that the described method of adding and co-mingling the two pulverized materials is highly efficient, effective and requires but a bare minimum of equipment. Owing to the fact that both pulverized constituents are supported and in air suspension upon intial co-mingling the quite warm cement is not effective to dehydrate the gypsum objectionably while the cement cools to a final temperature desirably not substantially in excess of 160 degrees F.

Another cement conditioning agent found highly beneficial for the purpose of facilitating free flow of the finished cement product and other desirable properties associated with the use of the cement are also easily added to the clinker while en route from the classifier to the final air and cement separator 55. Reference is had to such conditioning agents as acetic acid, ammonium acetate and other related acetates found beneficial when added to cement in the proper amounts. In general, these acetates are quickly and uniformly dispersed through the pulverized clinker with ease and certainty while the pulverized material is being levitated under turbulent conditions in riser 30. According to this invention these conditioning agenst are introduced in solution form into the upper end of riser 30 in spray or atomized condition. The solution enters through a supply conduit 28 provided with an atomizing nozzle, not shown, directed upwardly. If the spray is fully atomized or in a minutely divided state, it does not adversely affect the pulverized clinker and is instantly intermixed with the air conveying the latter and imparts the desired beneficial effects on the pulverized cement particles.

A typical example representative of actual operating conditions and results achieved in the practice of the invention follows. Let it be assumed that the system is designed to pulverize 1200 pounds per minute of clinker fed into mill 10 at a temperature of 100 degrees F. Pulverizing clinker at this rate is found to require a power input to the mill of approximately 1250 horsepower. It is found in practice that approximately 70% of this input energy to drive the mill is converted into heat which is absorbed by the clinker undergoing pulverization, and effective to raise the clinker and the pulverized product to approximately 265 degrees F., ignoring heat losses by radiation and convection. If an air flow of 38,700 c.f.m. is employed to levitate 1200 pounds per minute of pulverized clinker, using ambient air at a temperature of 90 degrees F., then it is found that the cement issuing from the system will have a temperature of 135 degrees F., or very substantially below that found injurious to the properties of clinker conditioning agents, particularly the gypsum component. Finished cement at this temperature is well within satisfactory limits specified by cement users. Should a temperature in excess of 135° be acceptable, or should the ambient temperature be less than 90°, then the volume of levitating air can be reduced accordingly.

In the foregoing example, the temperature of the gypsum constituent has been disregarded since its temperature when introduced into riser 30 is normally atmospheric or well below the temperature of the pulverized clinker constituent. Accordingly it has a slight additional cooling effect on the cement. Likewise convection and radiation losses have been ignored.

In closing it is pointed out that the showing made in the drawing is purely schematic and that no attempt has been made to represent the relative sizes of the various ducts and principal components as to do so would complicate the drawing needlessly. For example, it will be readily apparent from FIGURE 1 that the size of suction fan 61 and of its inlet duct 60 are grossly disproportionate to the cross-sectional area of riser 30. Similarly, it will be understood that the relative proportions of ducts 70, 73, 75 are not intended as typical or significant. Similar remarks apply to the relative proportions of other components.

While the particular method and apparatus for making and cooling cement herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That improvement in the pulverization of cement clinker to provide a fully finished cement end product cooled to a temperature of approximately 150 degrees F. which comprises: circulating cement clinker of a wide range of sizes in a closed circuit through a clinker classifier and a pulverizing mill to reduce said clinker to predetermined pulverized fineness, collecting pulverized cement clinker of the desired fineness from the classifier and levitating the same in a column of ambient atmospheric air to extract heat therefrom and to cool the cement to approximately 150 degrees F., adding and mixing a gypsum set retardant with said air cooled cement, passing the air and cooled cement and set retardant mixture from said column into a cement and air separator, returning the separated air to the atmosphere, and conducting the cooled fully finished cement product away from said air and cement separator.

2. That improvement defined in claim 1 characterized in the step of operating said clinker classifier, said pulverizing mill and said levitating column under subatmospheric pressure.

3. That method of preparing finished cement from precooled clinker which comprises recirculating said clinker between a pulverizing operation and classifier means for separating out finely pulverized clinker therefrom, passing finely pulverized clinker into a column of cool levitating air at ambient temperature and there cooling said pulverized clinker to a temperature substantially below 200 degrees F., adding and thoroughly mixing a set retarding proportion of finely pulverized gypsum to said mixture of levitating air and pulverized clinker after the pulverized clinker has been cooled to a temperature below 200 degrees F., and in the presence of sufficient cool levitating air to prevent substantial dehydration of said pulverized gypsum, separating the mixture of pulverized clinker and gypsum from the levitating air after the temperature of said mixture has cooled to approximately 150 degrees and conducting the finished cement and gypsum mixture cooled to a temperature of approximately 150 degrees F. into storage.

4. That method of preparing a finished cement mixture which comprises recirculating precooled clinker between a pulverizing operation and classifier means for separating out finely pulverized clinker, passing finely pulverized clinker into a column of cool levitating air at ambient temperature and there cooling said pulverized clinker to a temperature substantially below 175 degrees F., admixing a set retarding proportion of finely pulverized gypsum set retardant to the levitating air column at a point such that the temperature of the retardant does not exceed 160 degrees F. and further adding an atomized spray of an agent to render the resulting cement mixture free flowing, separating out the solid constituents of said mixture from the cooling air, returning the separated air to the atmosphere, and conducting the finished cement mixture from said separating operation directly at a temperature not in excess of 150 degrees F. to a place of storage.

5. That improvement in the preparation of cement from precooled clinker to provide a finished cement product admixed with conditioning agents including nondehydrated gypsum, which improvement comprises separately pulverizing precooled clinker and gypsum chunks, said gypsum being pulverized at a temperature below that producing any substantial dehydration of the gypsum and in set retarding amounts for the finished cement product, levitating the separately pulverized clinker and pulverized gypsum into separate flowing streams of cool ambient air to absorb the heat of grinding from said pulverized clinker down to a temperature of substantially 150 degrees F., merging the separate airborne streams of pulverized clinker and pulverized gypsum at a point such that the pulverized gypsum is not heated above 160° F., adding to said airborne stream of pulverized clinker and gypsum an atomized spray of a clinker conditioning agent effective to increase the free flowing characteristics of the finished cement product, and separating out the air leaving a finished cooled cement product ready for storage until needed to make concrete.

6. That improved method of making a cooled cement product ready for immediate use or storage and containing conditioning agents substantially unimpaired by excessive temperatures adversely affecting desired properties in the finished product and likely to arise during the pulverizing and mixing of constituents of said cooled cement product, said improved method comprising separately pulverizing gypsum and cement clinker after the clinker has cooled to a temperature approaching the ambient atmospheric air temperature, maintaining the gypsum temperature below 175 degrees F. during pulverizing thereof to prevent loss of water of hydration, passing a stream of cool ambient air through a cooling riser and then through a cement and air separator, introducing finely pulverized clinker and finely pulverized gypsum into said stream of cool air with said gypsum being introduced at a point where the pulverized clinker temperature is not in excess of 175 degrees F. to avoid dehydrating said gypsum and in a set retarding amount for said cooled cement product, transfering heat from the pulverized clinker and pulverized gypsum to the cooling air, and separating the cooling air from the admixed pulverized clinker and gypsum to provide a cooled cement product at a temperature ranging between 125 degrees and 160 degrees F. and suitable for use or storage.

7. That method of preparing a pulverized cement product in an operation isolated from and independently of a clinker producing kiln using precooled clinker obtained from a bulk supply thereof, said method comprising pulverizing said precooled clinker while recirculating the same between a pulverizing station and a classifier station for separating fully pulverized clinker from incompletely pulverized clinker, simultaneously pulverizing gypsum under controlled temperature conditions not in excess of those releasing water of hydration from the gypsum, levitating pulverized clinker in an ambient air stream adequate to cool the cement to a temperature of approximately 150 degrees F. while suspended in said stream, introducing pulverized gypsum into said stream at a rate to provide set retarding proportions of gypsum in the cement product and at a point where the pulverized clinker has been cooled to a temperature below that producing substantial dehydration of the gypsum, and conducting the cooled thoroughly mixed stream of pulverized clinker and gypsum into an air and cement separator to separate out the cooling air leaving behind as residue uniformly mixed pulverized cement product of pulverized clinker and gypsum having a temperature of approximately 150 degrees F.

References Cited

UNITED STATES PATENTS

| | | | |
|---|---|---|---|
| 1,618,295 | 2/1927 | Pontoppidan | 106—102 |
| 1,943,817 | 11/1934 | Dunton | 106—100 |
| 2,609,149 | 9/1952 | Posselt | 241—23 X |
| 2,721,806 | 10/1955 | Oberg et al. | 241—23 X |
| 2,770,543 | 11/1956 | Arnold et al. | 241—23 X |
| 2,819,172 | 1/1958 | Trief | 106—102 |
| 2,841,384 | 7/1958 | Petersen | 241—17 |
| 2,857,286 | 10/1958 | Striker | 106—102 |
| 2,916,215 | 12/1959 | Weston et al. | 241—23 X |
| 2,933,260 | 4/1960 | Tessmer | 241—23 X |
| 3,003,757 | 10/1961 | Mitchell | 241—23 X |
| 3,011,727 | 12/1961 | Varkony | 241—171 |
| 3,068,110 | 12/1962 | Fagerholt | 106—102 |

TOBIAS E. LEVOW, *Primary Examiner.*

DONALD L. MAXSON, J. SPENCER OVERHOLSER,
*Examiners.*

S. E. MOTT, *Assistant Examiner.*